April 9, 1963  J. W. G. GREGORY ET AL  3,085,156
APPARATUS FOR MEASURING THE AMOUNT OF URANIUM CONTAMINATION
ON THE OUTER SURFACES OF FUEL ELEMENTS
Filed March 16, 1959
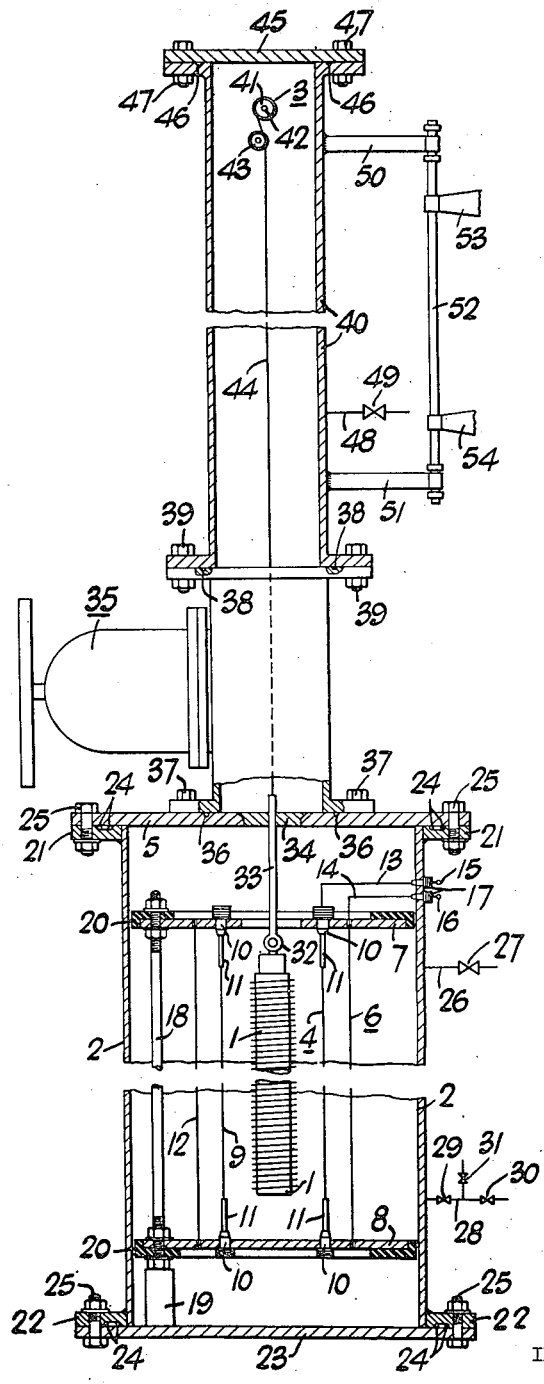
INVENTORS
JOHN WILLIAM GEORGE GREGORY
RICHARD BRUCE OWEN
BY Larson and Taylor

United States Patent Office 3,085,156
Patented Apr. 9, 1963

3,085,156
APPARATUS FOR MEASURING THE AMOUNT OF URANIUM CONTAMINATION ON THE OUTER SURFACES OF FUEL ELEMENTS
John William George Gregory, Seascale, and Richard Bruce Owen, Abingdon, England, assignors to United Kingdom Atomic Energy Authority, London, England
Filed Mar. 16, 1959, Ser. No. 799,612
Claims priority, application Great Britain Mar. 28, 1958
2 Claims. (Cl. 250—83.6)

This invention relates to apparatus for measuring the amount of uranium contamination on the outer surfaces of fuel elements.

The sensitivity of apparatus for detecting the presence of burst uranium fuel elements in an operating gas-cooled nuclear reactor by coolant sampling is determined to a large extent by the uranium contamination in the circuit of the coolant, principally on the surfaces of the fuel elements. It is therefore necessary to ensure that, before loading into a reactor, the fuel elements are cleaned and the residual uranium contamination is below a specified amount of the order of a microgram per foot length of fuel element (as related to a circumferentially finned cylindrical fuel element).

Various methods have been proposed for detecting uranium contamination on the outer surfaces of fuel elements. In one method the fuel element is exposed to a neutron flux and the beta activity of decayed gaseous fission products produced from uranium contamination by the flux is detected. In a second method the fuel element is exposed to a neutron flux and fisson fragments from uranium contamination are detected by means of the scintillations the fission fragments produce in a phosphor near to the fuel element. In a third method the emission of alpha particles naturally associated with uranium is detected in a scintillation screen.

In measuring low contamination levels (e.g., one microgram per foot length of fuel element), the first method requires a high neutron flux, resulting in tested fuel elements of high activity with consequent handling problems. The second method, whilst not requiring such a high neutron flux as the first method, nevertheless has the problems associated with exposure of a fuel element to a neutron flux. The third method suffers from time taken to carry out the test as the fuel element has to be scanned slowly past the screen. It is an object of the present invention to provide apparatus for measuring the alpha particle emission from the outer surface of a fuel element by a more rapid method than that previously employed.

According to the present invention apparatus for measuring alpha particle emission from uranium contamination on the outer surface of a fuel element comprises an evacuable chamber having means for insertion and withdrawal of the fuel element in to and out from the chamber, means for supporting the fuel element within the chamber and an electrode system which allows gas to pass freely therethrough mounted in the chamber so as to surround a fuel element supported therein.

In operation of the apparatus of the invention the electrode system surrounding the fuel element is made positive relative to the chamber and gas readily ionised by alpha particles is admitted into the chamber. Electrons arising from ionisation of the admitted gas are attacted to the positive electrode and give rise to voltage pulses which can be recorded.

Apparatus according to the invention can be given enhanced sensitivity by providing a guard electrode between the anode electrode and the chamber and by constructing the apparatus generally of material having a low rate of alpha particle emission such as steel which gives an alpha count of about 25 per square foot per hour.

By way of example, the invention will now be described with reference to the single FIGURE of the accompanying drawing which is a sectional elevation.

In the drawing, apparatus for measuring alpha particle emission from uranium contamination on the outer surface of a fuel element 1 comprises an evacuable chamber 2 having a winding mechanism 3 for insertion and withdrawal of the fuel element 1 in to and out from the chamber 2 and an end plate 5 from which the fuel element 1 is supported. An anode electrode 4 of generally cylindrical form is mounted in the chamber 2 so as to surround the supported fuel element.

A guard electrode 6 of generally cylindrical form is provided between the electrode 4 and the chamber 2, and the apparatus generally is constructed of steel having an alpha count of about 25 per square foot per hour.

In greater detail, the electrode 4 spans between circular end plates 7, 8 and is in the form of a wire 9 threaded between the end plates, 7, 8 six times so that the six threads are equally spaced on a pitch circle of four inches diameter. The wire 9 is insulated from the plates 7, 8 by insulators 10 and is 0.005 inch in diameter, and the ends of the six threads pass through short lengths of narrow bore tubing 11. This arrangement of the electrode 4 allows gas to pass freely through it.

The electrode 6 also spans between the end plates 7, 8 and is in the form of a wire 12 threaded between the end plates 7, 8 sixteen times so that the sixteen threads are equally spaced on a pitch circle of six inches diameter. The wire 12 is 0.010 inch in diameter. The electrodes 4, 6 are connected by wires 13, 14 to terminals 15, 16, insulators 17 being provided for the wires 13, 14 where they pass through the chamber 2. The end plates 7, 8 are carried by three equi-spaced tie-bolts 18 mounted in the chamber 2 on insulating blocks 19, insulating rings 20 being provided for the end plates 7, 8.

The chamber 2 is twelve inches in diameter and fifty four inches long, and has welded end flanges 21, 22 to which the end plate 5 and an end plate 23 respectively are sealed by sealing rings 24 and bolts 25. The chamber 2 is provided with a pipe 26 having a control valve 27 and a branched pipe 28 having control valves 29, 30 and a leak valve 31. The fuel element 1 has a hook 32 to which is coupled a support rod 33 carrying a support plate 34 which locates in a hole in the end plate 5.

A valve 35 having dimensions allowing the passage of a fuel element is sealed to the end plate 5 by a sealing ring 36 and bolts 37. The valve 35 is also sealed by a sealing ring 38 and bolts 39 to a chamber 40. The chamber 40 houses the winding mechanism 3 comprising a winding pulley 41 mounted on a drive shaft 42 (sealed in passage through the chamber 40), a guide pulley 43 and a wire 44 connected at one end to the pulley 41 and at the other end to the support rod 33. The chamber 40 has an end plate 45 sealed by a sealing ring 46 and bolts 47, and a pipe 48 having a control valve 49. Welded to the chamber 40 are support arms 50, 51 rotatably mounted on a shaft 52 carried by support arms 53, 54.

Operation of the apparatus will now be described commencing with the procedure adopted for inserting the fuel element 1 into the chamber 2 from an external point. The valve 35 is closed, the bolts 39 undone and the chamber 40 pivoted about the shaft 52 so as to be clear of the chamber 2. The rod 33 is then coupled to the fuel element 1 which is then wound up into the chamber 40 using the winding mechanism 3. The chamber 40 is then swung back into position over the valve 35 and the bolts 39 are tightened. The air in the chamber 40 is then evacuated via the pipe 48 and the chamber 40 is filled with pure argon to a pressure of one atmosphere, followed by closing of the valve 49. The air in the chamber 2 is evacuated via the pipe 26 and the chamber 2 is filled with pure argon to a pressure of one atmosphere, followed by closing of the valve 27. The valve 35 is then opened and the fuel element 1 is lowered to the position shown in the drawing using the winding mechanism 3.

Measurement of the amount of uranium contamination on the outer surface of the fuel element 1 is now carried out. During measurement a flow of argon is provided by maintaining the pressure of argon in the apparatus at slightly over one atmosphere and allowing a controlled leak from the leak valve 31. A potential difference is maintained between the chamber 2 and the electrodes 4, 6 by applying a positive voltage (e.g. +1.7 kv.) to the electrode 4 and a negative voltage (a.g. —300 v.) to the electrode 6. Alpha particle emissions from uranium contamination on the outer surface of the fuel element 1 give rise to ionisation of the argon, the resulting electrons passing to the electrode 4 to give voltage pulses which are recorded.

In the apparatus described above, the distance between the electrode 4 and the walls of the chamber 2 is such as to be greater than the range of alpha particles in argon at one atmosphere pressure. Electrons formed by gas ionisation outside the electrode 6 are repelled in a direction away from the electrode 4 by the negatively charged electrode 6. The lengths of tubing 11 produce regions of low gas amplification factor in the neighbourhood of the end plates 7, 8 so that alpha particle emissions from the end plates 7, 8 give much smaller voltage pulses on the electrode 4 than alpha particles emitted from the fuel element 11, and these smaller pulses are not recorded.

We claim:
1. In an alpha counting apparatus of the type comprising a chamber having connections for passing alpha ionizable gas through the chamber and electrodes for generating an electric field in the chamber including collector electrodes, the features of a gas lock for said chamber, means in said gas lock for advancing alpha emitting elements of elongated form into said chamber free of contact with the chamber and its electrodes, an alpha emitting element attached to said means, said collector electrodes being in the form of elongated strands co-extensive with and spaced from and around said alpha emitting element, and a guard electrode consisting of elongated strands co-extensive with said alpha emitting element and spaced outside said collector electrodes relative to said alpha emitting element.

2. Apparatus according to claim 1 wherein said elongated strands of the collector electrodes pass through short length of narrow-bore tubing at their ends to produce regions of reduced gas amplication factor.

References Cited in the file of this patent

UNITED STATES PATENTS

| | | |
|---|---|---|
| 2,490,298 | Ghiorso et al. | Dec. 9, 1949 |
| 2,531,144 | Manley | Nov. 21, 1950 |
| 2,598,215 | Borkowski et al. | May 27, 1952 |
| 2,622,208 | Bernstein et al. | Dec. 16, 1952 |
| 2,640,953 | Rossi | June 2, 1953 |
| 2,845,544 | Seaborg et al. | July 29, 1958 |
| 2,957,084 | Marr et al. | Oct. 18, 1960 |